May 17, 1955

R. E. REEVE 2,708,448

WASHER FOR MILKING MACHINES

Filed Aug. 4, 1952

INVENTOR
ROBERT E. REEVE
BY
Webster & Webster
ATTY'S.

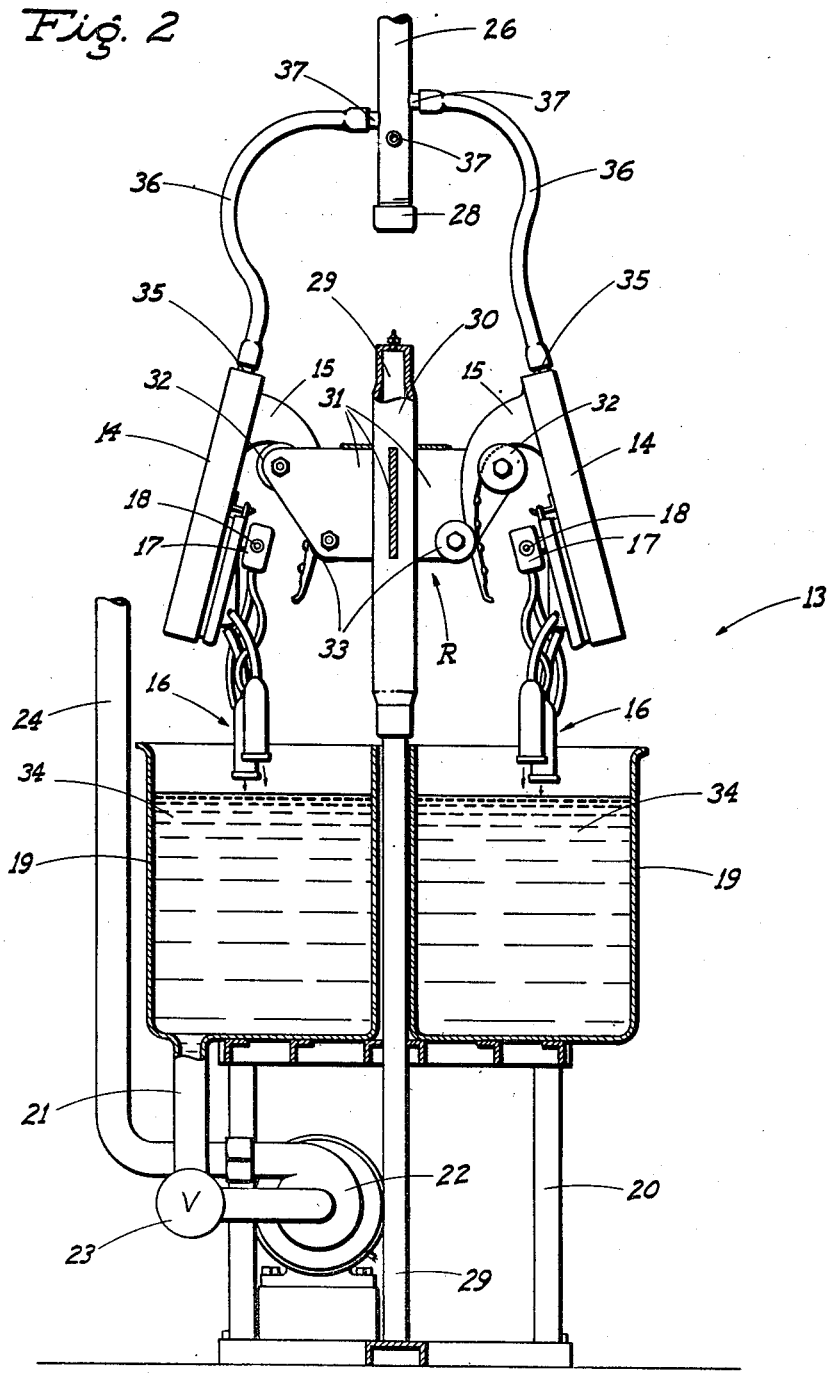

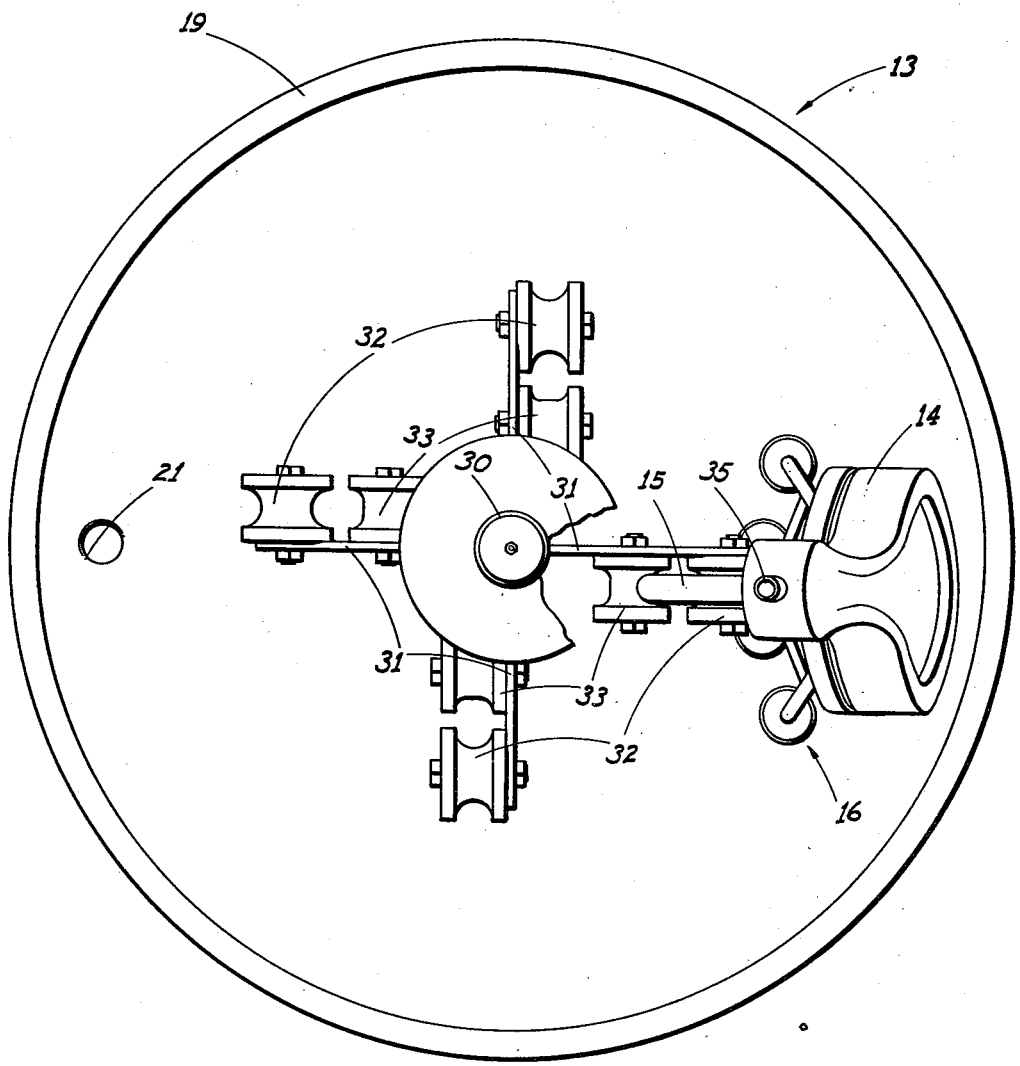

United States Patent Office 2,708,448
Patented May 17, 1955

2,708,448

WASHER FOR MILKING MACHINES

Robert E. Reeve, Tracy, Calif.

Application August 4, 1952, Serial No. 302,463

3 Claims. (Cl. 134—168)

This invention relates in general to improvements in continuous or pipe-line type milking machines or systems, i. e. wherein the milk flows from each teat cup assembly through a connected transfer or pail unit suspended from the cow, and thence transfers by hose to a pipe line wherein the milk delivers—by vacuum—to a releaser, which in turn discharges into a central receiving tank.

The primary object of the present invention is to provide a novel apparatus for flushing, with water and a sterilizing agent, a major portion of a pipe line type milking machine or system; the apparatus including a novel washing device for the suspension and flushing of the milk transfer or pail units, including the teat cup assemblies thereon.

Another object of the present invention is to provide a washing device, as above, which is fitted with a novel rotary rack for the reception of the milk transfer or pail units in a position suspended directly above the water tank which the device includes, and with said units connected by hoses to a wash water pipe; all whereby the wash water flows through the milk transfer or pail units, together with the teat cup assemblies, and then discharges into the tank.

An additional object of this invention is to provide a washing device, as in the preceding paragraph, wherein the rotary rack is constructed in a manner to permit of easy and convenient manual placement thereon, or removal therefrom, of said milk transfer or pail units.

It is also an object of the invention to provide an automatic washer, for milking machines, which is designed for ease and economy of manufacture, installation, and operation.

A still further object of the invention is to provide a practical and reliable automatic washer for milking machines, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged vertical cross section of the washing device.

Fig. 3 is a top plan view of said washing device.

Figure 1:
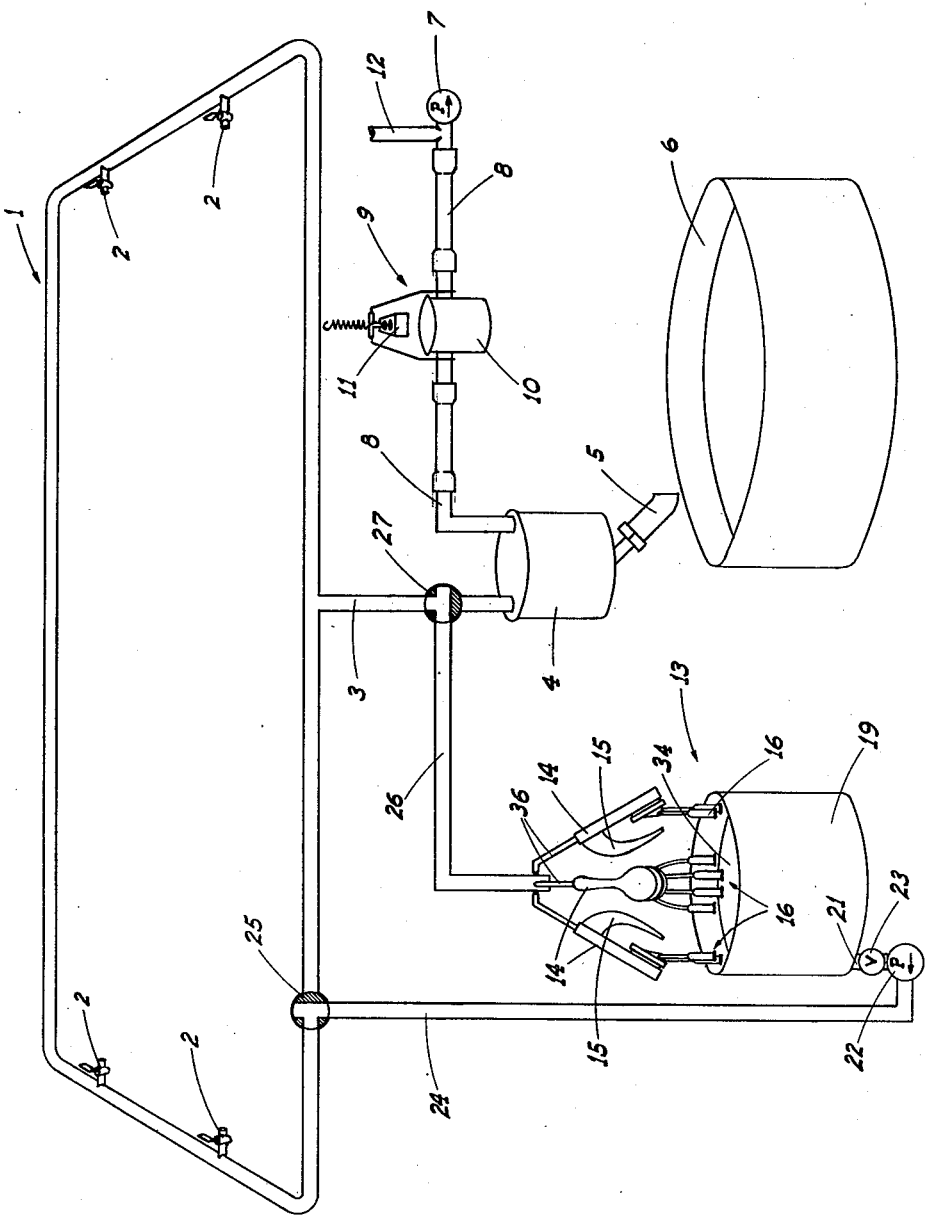
Fig. 1 is a diagrammatic representation of a continuous or pipe line type milking machine or system embodying the present invention.

Referring now more particularly to the characters of reference on the drawings, and at present to Fig. 1, the continuous or pipe line type milking machine or system in connection with which the invention is used, comprises—generally—a continuous milk delivery pipe 1 mounted in the barn, and having connector valves 2 in communication with said pipe adjacent each milking station; the valves 2 being of the manually shut-off type and each being adapted for connection to a hose (not shown) which leads to the milk transfer or pail unit as suspended by a surcingle beneath the belly of the corresponding cow. For the purpose of the present application the milk transfer or pail units, hereinafter specifically identified, are not shown in use for milking, but this is conventional.

A lateral pipe 3 leads from the continuous milk delivery pipe 1 to a releaser 4, which releaser includes, at the bottom, a discharge pipe 5 disposed directly above a refrigerated or cold-wall type milk receiving tank 6. The pipes 1 and 3, and the releaser 4, are maintained under vacuum by a vacuum pump 7 connected to the releaser 4 by a vacuum conduit 8. The releaser 4 may be of the type shown in my copending application, Serial No. 231,201, filed June 12, 1951.

In order to prevent the accidental flow of milk from the vacuum conduit 8 to the vacuum pump 7, with possible damage to the latter, the vacuum conduit 8 has an automatic shut-off device, indicated generally at 9, interposed therein. Such automatic shut-off device 9 is shown in detail in my copending application, Serial No. 302,464, filed August 4, 1952, and includes a vertically movable enclosed container 10 connected into the conduit 8 by flexible portions of the latter, as shown; any liquid which enters the container 10 causing the latter to lower, which in turn opens a switch 11 interposed in the circuit for the electric motor (not shown) which drives the vacuum pump 7.

The conduit 12 which extends as a lateral from the conduit 8 leads in its full length into the barn and supplies the vacuum which actuates the pulsators of the milk transfer or pail units in the customary manner.

The present invention contemplates the provision of a washer, for the milking machine, of the following structural arrangement, shown in detail in Figs. 2 and 3.

The primary structure of the washer is a washing device, indicated generally at 13, which device is for the purpose of supporting and flushing the milk transfer or pail units after each use thereof and upon removal from the cows; each such milk transfer or pail unit being indicated at 14.

The milk transfer or pail units 14, as shown in copending application, Serial No. 212,542, filed February 24, 1951, are each of "banjo" shape, having a gooseneck handle 15 which extends upwardly and rearwardly from the front in overhanging relation to the unit. Additionally, each milk transfer or pail unit 14 includes a connected teat cup assembly 16 actuated by a pulsator 17. The pulsators 17 have fittings 18 adapted for hose connection with the adjacent portion of the conduit 12.

The washing device 13 is disposed at a central station, preferably exteriorly of the barn—i. e. in the wash room of the dairy—and comprises an open-topped, wash-water tank 19 supported on a pedestal 20, with a down-spout 21 leading from the bottom of such tank into a water pump 22; there being a shut-off valve 23 interposed in the down-spout 21.

A wash-water feed pipe 24 leads from the pump 22 and connects at one point with the continuous milk delivery pipe 1 by means of a three-way, manually regulated valve 25. A wash-water return pipe 26 connects with the lateral pipe 3 by means of a manually regulated, three-way valve 27; the return pipe 26 extending to a capped termination, as at 28, directly above the wash-water tank 19 centrally of the latter.

The pedestal 20 includes a fixed post 29 which extends upwardly through the wash-water tank 19, projecting some distance thereabove and terminating in adjacent but spaced axial alinement with the capped end of the wash-water return pipe 26.

A sleeve 30 is turnably mounted on the upper end portion of the post 29 above the tank 19, and vertical mounting plates 31 radiate from such sleeve in circumferentially spaced relation; there being four of such mounting plates in the present instance.

Each mounting plate 31 carries, on transverse axes, an upper roller 32 and a corresponding lower roller 33 therebelow in radially inwardly offset relation.

The milk transfer or pail units 14 are each supported from one of the mounting plates 31 by engaging the gooseneck handle 15 over an upper roller 32 and in front of the corresponding lower roller 33. This effectively supports each milk transfer or paid unit 14 directly above the wash-water tank 19, with the teat cup assemblies 16 depending into the tank but suspended above the surface of the wash water 34 in such tank.

With the milk transfer or pail units 14 thus supported on the rotary rack R which the sleeve 20, plates 31, and rollers 32 form, the output nipples or fittings 35 of said units are connected by hoses 36 with corresponding fittings 37 on the pipe 26 directly above the cap 28.

As the rack R is rotary, a person can stand at one point and progressively load the rack with step by step turning thereof; the hoses 36 initially remaining uncoupled, or being of a length to permit such turning of said rack.

The washer, as described above, functions in the following manner:

With the valves 2 shut off, and the valves 25 and 27 in the positions shown in Fig. 1, the pump 22—after opening the valve 23—is placed in operation. The pump, as it operates, draws water from the tank 19, and circulates the water through the pipes 24, 1, 3, and 26, with the flow being directed through such pipes in the order of their enumeration.

As the flow of water reaches the capped end portion of the pipe 26, such water delivers through the fittings 37 and hoses 36 into the milk transfer or pail units 14 as supported on the rotary rack. From the milk transfer or pail units 1 the water flows through the teat cup assemblies 16, and thence discharges or returns to the tank 19. That portion of the pipe 1 between the valve 25 and the lateral pipe 3 is flushed by merely reversing the position of said valve 25.

It will thus be recognized that the washer functions to effectively flush—after each milking—substantially the entire pipe line system, together with the milk transfer or pail units. Those portions of the system which are not so flushed, such as the releaser 4 and its discharge pipe 5, are designed to be readily dismantled for cleansing.

During milking, and when the washer is not in use, the valve 25 is set to a position establishing direct communication along the pipe 1 and shutting off the pipe 24. Similarly, the valve 27 is turned to establish direct communication along the pipe 3, while shutting off the pipe 26.

The invention thus provides apparatus which greatly facilitates the maintenance of continuous or pipe line type milking systems at dairies; the flushing of the pipe line system being one great advantage, while another is the provision of the washing device 13 by means of which the milk transfer or pail units are readily handled and cleansed.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as being new and useful, and upon which Letters Patent are desired:

1. A washer for milking apparatus including milk transfer or pail units comprising a tank for wash water, a post upstanding from the tank, a rack on the post adapted to suspend detached milk transfer or pail units above the water in the tank, and a pump and conduit system adapted to feed water from the tank through the suspended units to flush the latter; each of said units including a gooseneck handle, and said rack including vertical plates radiating from the post, and a pair of supporting elements projecting laterally from the same side of each plate in vertically spaced relation with the lowermost element radially inwardly offset whereby the handle of the corresponding suspended unit engages over the uppermost element and in front of the lowermost element.

2. A washer, as in claim 1, in which the elements are rollers.

3. A washer as in claim 1, in which the rack includes a sleeve on which said plates are secured, the sleeve being turnable on the post and having its upper end closed and resting on the upper end of the post in supported relation.

References Cited in the file of this patent

UNITED STATES PATENTS

| Number | Name | Date |
|---|---|---|
| 1,393,387 | McCornack | Oct. 11, 1921 |
| 1,846,805 | Hapgood | Feb. 23, 1932 |
| 1,918,048 | Marxman | July 11, 1933 |
| 2,023,007 | Delano | Dec. 3, 1935 |
| 2,213,069 | Engels | Aug. 27, 1940 |
| 2,233,852 | Schmitt | Mar. 4, 1941 |
| 2,558,628 | Redin | June 26, 1951 |
| 2,595,539 | Redman | May 6, 1952 |
| 2,624,355 | Buchinger | Jan. 6, 1953 |